(12) United States Patent
Fujimoto et al.

(10) Patent No.: US 10,880,694 B2
(45) Date of Patent: Dec. 29, 2020

(54) SERVICE ASSISTANCE DEVICE, SERVICE ASSISTANCE METHOD, AND COMPUTER READABLE STORAGE MEDIUM

(71) Applicant: HONDA MOTOR CO., LTD., Tokyo (JP)

(72) Inventors: Naotoshi Fujimoto, Wako (JP); Yo Ito, Tokyo (JP); Seiichi Yamamoto, Tokyo (JP); Susumu Iwamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 16/006,986

(22) Filed: Jun. 13, 2018

(65) Prior Publication Data
US 2018/0367957 A1 Dec. 20, 2018

(30) Foreign Application Priority Data
Jun. 15, 2017 (JP) ................. 2017-117724

(51) Int. Cl.
| | |
|---|---|
| *G06F 15/16* | (2006.01) |
| *H04W 4/06* | (2009.01) |
| *H04W 4/40* | (2018.01) |
| *H04W 4/02* | (2018.01) |
| *H04W 4/08* | (2009.01) |
| *H04L 29/08* | (2006.01) |

(52) U.S. Cl.
CPC ............... *H04W 4/06* (2013.01); *H04W 4/02* (2013.01); *H04W 4/08* (2013.01); *H04W 4/40* (2018.02); *H04L 67/16* (2013.01); *H04L 67/18* (2013.01)

(58) Field of Classification Search
CPC .......... H04L 67/16; H04L 67/18; H04W 4/02; H04W 4/06; H04W 4/08; H04W 4/40
See application file for complete search history.

(56) References Cited

U.S. PATENT DOCUMENTS

| | | | |
|---|---|---|---|
| 2014/0046591 A1* | 2/2014 | Boldyrev | ........... G01C 21/3438 701/533 |
| 2016/0320198 A1* | 11/2016 | Liu | ..................... G01C 21/3438 |
| 2016/0371607 A1* | 12/2016 | Rosen | ..................... G06Q 10/02 |

FOREIGN PATENT DOCUMENTS

| | | |
|---|---|---|
| CN | 103994770 | 8/2014 |
| JP | 2004-145673 | 5/2004 |
| JP | 2005-003526 | 1/2005 |
| JP | 2006-190148 | 7/2006 |
| JP | 2007-187675 | 7/2007 |

(Continued)

OTHER PUBLICATIONS

Japanese Office Action for Japanese Patent Application No. 2017-117724 dated Jun. 18, 2019.

(Continued)

*Primary Examiner* — Normin Abedin
(74) *Attorney, Agent, or Firm* — Amin, Turocy & Watson, LLP

(57) ABSTRACT

A service assistance device includes an acquirer configured to acquire position information associated with each of a plurality of users and movement direction information associated with each of the plurality of users; a group former configured to group some or all of the plurality of users on the basis of the position information and the movement direction information; and a service specifier configured to specify a service for the users on the basis of attributes of the users included in the group.

10 Claims, 13 Drawing Sheets

(56) References Cited

FOREIGN PATENT DOCUMENTS

| | | |
|---|---|---|
| JP | 2016-085734 | 5/2016 |
| JP | 2017-021529 | 1/2017 |

OTHER PUBLICATIONS

Japanese Office Action for Japanese Patent Application No. 2017-117724 dated Nov. 27, 2018.
Japanese Notice of Allowance for Japanese Patent Application No. 2017-117724 dated Jan. 14, 2020.

* cited by examiner

| USER ID | POSITION | DESTINATION | MOVEMENT DIRECTION | ATTRIBUTE | VEHICLE ID |
|---|---|---|---|---|---|
| 0001 | (, ) | (, ) | (, ) | (, ) | ** |
| 0002 | (, ) | (, ) | (, ) | (, ) | ** |
| ... | ... | ... | ... | ... | ... |

| GROUP SERVICE PROVIDING POINT ID | POSITION | CONTENT | CONTENT OF SERVICE |
|---|---|---|---|
| A | (**, **) | △△ HOT SPRING | GROUP DISCOUNT WITH △△ OR MORE PERSONS |
| B | (**, **) | ○○ HARBOR | RESERVATION OF ○○ SHIP WITH △△ OR MORE PERSONS |
| C | (**, **) | ... | ... |
| ... | ... | ... | ... |

386

| GROUP ID | VEHICLE ID | USER ID | GROUP SERVICE PROVIDING POINT (DESTINATION) | SERVICE TO BE RECEIVED |
|---|---|---|---|---|
| G1 | 200-1 | **, **, **, ** | D | ○○ YEN DISCOUNT |
|  | 200-2 | **, **, **, ** | D | ○○ YEN DISCOUNT |
|  | 200-3 | **, **, **, ** | D | ○○ YEN DISCOUNT |
| G2 | 200-6 | ****, ****, **** | E | ** |
|  | 200-4 | ****, ****, **** | E | ** |
|  | 200-5 | ****, ****, **** | E | ** |
|  | 200-7 | ****, ****, **** | E | ** |
|  | 200-8 | ****, ****, **** | E | ** |
| ⋮ | ⋮ | ⋮ | ⋮ | ⋮ |

SERVICE ASSISTANCE DEVICE, SERVICE ASSISTANCE METHOD, AND COMPUTER READABLE STORAGE MEDIUM

CROSS-REFERENCE TO RELATED APPLICATION

Priority is claimed on Japanese Patent Application No. 2017-117724 filed Jun. 15, 2017, the content of which is incorporated herein by reference.

BACKGROUND OF THE INVENTION

Field of the Invention

The present invention relates to a service assistance device, a service assistance method, and a computer readable storage medium.

Description of Related Art

In the related art, an invention of an information processing device capable of giving a privilege with respect to a situation of reaching a target point is disclosed (see Japanese Unexamined Patent Application, First Publication No. 2017-21529). This device includes a point determination unit that determines a target point and creates point information indicating the determined target point, a notification unit that notifies a terminal device of the point information created by the point determination unit, an acquisition unit that acquires position information of the terminal device, a determination unit that determines a situation in which the terminal device reaches the target point on the basis of the position information acquired by the acquisition unit, and a privilege giving unit that determines that a privilege is to be given on the basis of a determination result of the determination unit, and the point determination unit determines the target point on the basis of an attribute of a person corresponding to the terminal device.

SUMMARY OF THE INVENTION

In the related art, a service a user receives is not considered.

Aspects of the present invention provide a service assistance device, a service assistance method, and a computer readable storage medium that can allow a user who cannot normally receive a service to receive the service.

The service assistance device, the service assistance method, and the computer readable storage medium according to the present invention adopt the following configuration.

(1) An aspect of the present invention is a service assistance device, including: an acquirer configured to acquire position information associated with each of a plurality of users and movement direction information associated with each of the plurality of users; a group former configured to group some or all of the plurality of users on the basis of the position information and the movement direction information; and a service specifier configured to specify a service for the users on the basis of attributes of the users included in the group.

(2) In the aspect of the above (1), the service assistance device may further include a communicator configured to communicate with terminal devices of the users or vehicles that the users ride, and the service specifier may perform a process of providing an applied service to the users on the basis of an application request for the service transmitted by the vehicles or the terminal devices and received by the communicator.

(3) In the above (1), the service specifier of the service assistance device may provide information indicating that the users are grouped or information on the grouped users to the users in the group.

(4) In the above (1), the service specifier of the service assistance device may provide the users with authority information that is used when the users receive service.

(5) In the above (1), the service specifier of the service assistance device may reserve the service with content according to the attributes of the users included in the group.

(6) In the above (1), the service assistance device may further include a guide controller configured to guide the users or the vehicles that the users ride to approach one another on the basis of position information associated with the respective users belonging to the formed group.

(7) In the above (1), the service assistance device may further include a guide controller configured to provide the users with a route to which the users are directed after the users exit vehicles with guidance according to the attributes of the users included in the group.

(8) In the above (1), the users ride automatically driven vehicles, and the service assistance device may further include a guide controller configured to instruct the automatically driven vehicles to travel to a point at which the service is received.

(9) An aspect of the present invention is a service assistance method using an in-vehicle computer include acquiring position information associated with each of a plurality of users and movement direction information associated with each of the plurality of users; grouping some or all of the plurality of users on the basis of the position information; and specifying a service for the users on the basis of attributes of the users included in the grouped group.

(10) An aspect of the present invention is a non-transitory computer-readable storage medium that stores a computer program to be executed by a computer to perform at least: acquire position information associated with each of a plurality of users and movement direction information associated with each of the plurality of users; group some or all of the plurality of users on the basis of the position information and the movement direction information; and specify a service for the users on the basis of attributes of the users included in the grouped group.

According to aspects (1), (8), (9) and (10) above, it is possible to allow a user who cannot normally receive a service to receive the service.

According to the above aspect (2), since the process of providing an applied service to the users on the basis of an application request for the service is performed, it is possible to further improve convenience for the users.

According to the above aspect (3), the users can recognize that the group has been formed, or information on the users included in the group.

According to the above aspect (4), the users can acquire the authority information to be used when the users receive the service and receive the service at a destination using the acquired authority information.

According to the above aspect (5), since a service scheduled to be used after the users reach a destination is reserved with content according to the attributes of the user included in the group, it is not necessary for the users to make a reservation for the service.

According to the above aspect (6), since the users or the vehicles that the users ride are guided so that the users belonging to the formed group approach one another, the users can act as a group.

According to the above aspect (7), since the route to which the users are directed after the users exit the vehicles is provided to the users with guidance according to attributes of the users included in the group, the users can easily reach the destination.

BRIEF DESCRIPTION OF THE DRAWINGS

FIG. 4 is a diagram showing an example of content of user information.

FIG. 5 is a diagram showing an example of content of destination information included in map information.

DETAILED DESCRIPTION OF THE INVENTION

Hereinafter, embodiments of a service assistance device, a service assistance method, and a computer readable storage medium of the present invention will be described with reference to the drawings. For example, the service assistance device is a device that allows a user riding a vehicle and spending leisure time to receive a service that the user is normally unable to receive. The service is a group service that cannot be used unless the number of persons is equal to or greater than a certain number, for example. The group service may be a service in which a greater discount than that for general customers is given.

The vehicle is, for example, an automatically driven vehicle that fundamentally requires no driving operation. Hereinafter, description will be given on the assumption that the automatically driven vehicle is used for a service assistance system, but a manually driven vehicle may also be used. The vehicle may be a ride-sharing vehicle that acquaintances or a plurality of strangers may ride. A user who can receive the group service may be a user who moves on foot.

The service assistance device may be one function of the navigation server. That is, when a navigation system is in operation and a user operates the navigation system to search for information of a sightseeing spot or the like, the user receives information on a group service to be described below. Then, when the user is configured to perform an operation to receive the group service, the service assistance device executes a process of allowing the user to receive the group service.

First Embodiment

[Overall Structure]

Figure 1:
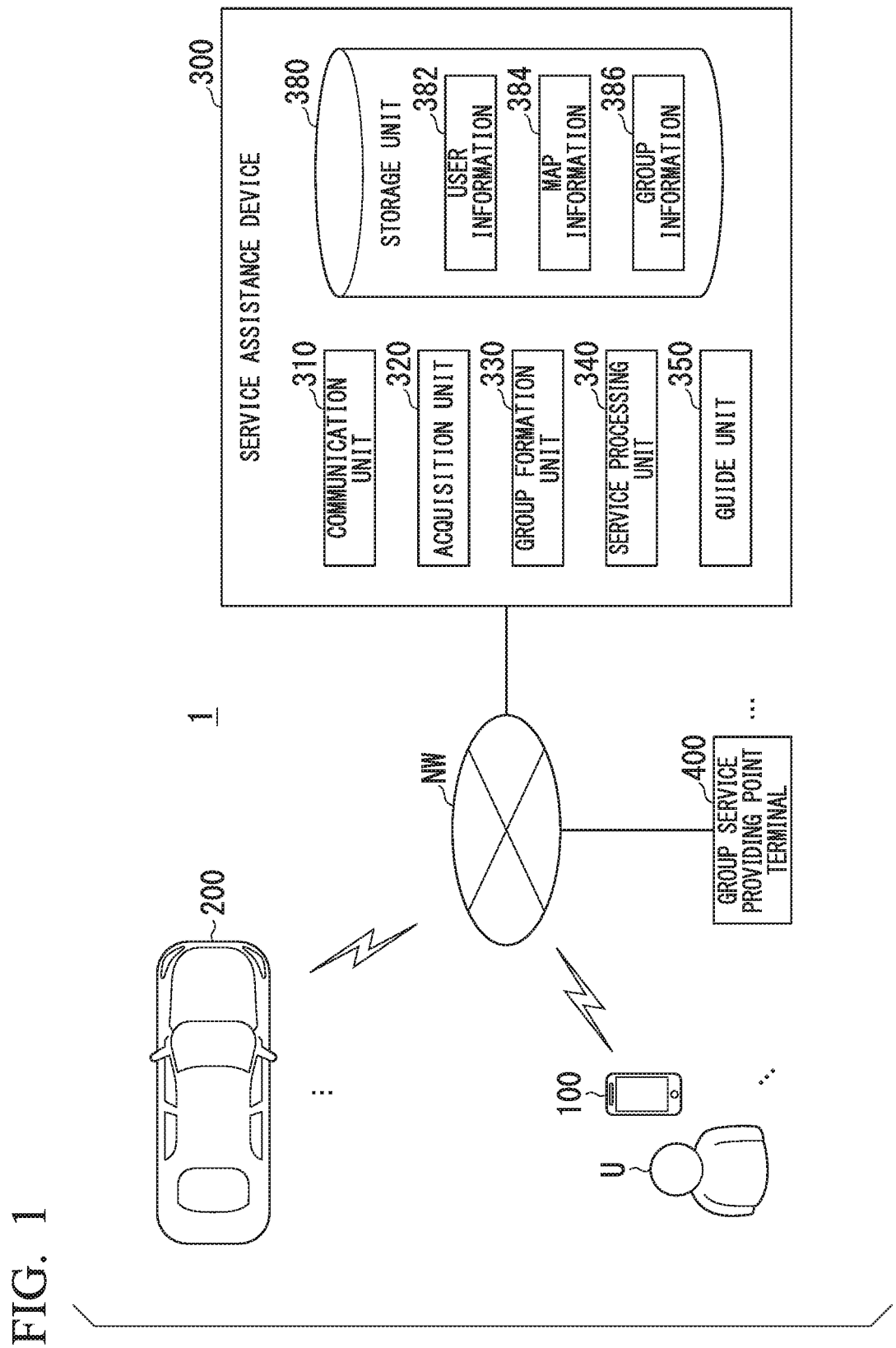
FIG. 1 is a configuration diagram of a service assistance system including a service assistance device.

FIG. 1 is a configuration diagram of a service assistance system 1 including a service assistance device 300. The service assistance system 1 includes one or more terminal devices 100 that are used by one or more users U, one or more vehicles 200, a service assistance device 300, and one or more group service providing point terminals 400. These components can communicate with each other via a network NW. The network NW may be the Internet, a wide area network (WAN), a local area network (LAN), a public line, a provider device, a dedicated line, a wireless base station, or the like. "Used by the user U" may include the user U temporarily using a terminal device that can be used by the general public, such as a terminal device of an Internet cafe.

[Terminal Device]

The terminal device 100 is, for example, a smartphone, a tablet terminal, or a personal computer. In the terminal device 100, an application program, a browser, or the like for using the service assistance system is activated to assist with a service to be described below. In the following description, it is assumed that the terminal device 100 is the smartphone, and an application program (service assistance application) is activated. The service assistance application communicates with the service assistance device 300 according to an operation of a user U to transmit a request of the user U to the service assistance device 300 and to perform a push notification on the basis of the information received from the service assistance device 300.

[Vehicle]

Figure 2:
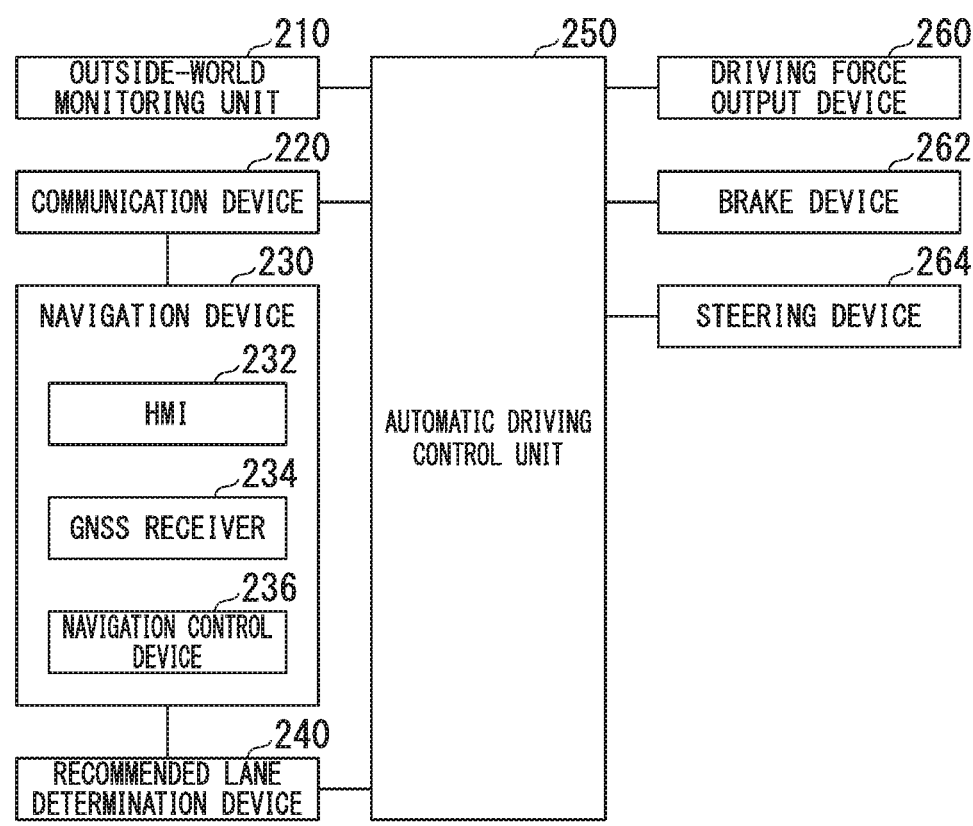
FIG. 2 is a configuration diagram of a vehicle.

The vehicle 200 is, for example, a vehicle having four or more wheels that a plurality of users U can ride, but may be a motorcycle or another vehicle. FIG. 2 is a configuration diagram of the vehicle 200. The vehicle 200 includes, for example, an outside-world monitoring unit 210, a communication device 220, a navigation device 230, a recommended lane determination device 240, an automatic driving control unit 250, a driving force output device 260, a brake device 262, and a steering device 264.

The outside-world monitoring unit 210 includes, for example, a camera, a radar, a light detection and ranging (LIDAR), and an object recognition device that is configured to perform a sensor fusion process on the basis of outputs thereof. The outside-world monitoring unit 210 estimates a type (in particular, a vehicle, a pedestrian, and a bicycle) of an object present in the vicinity of the vehicle 200 and outputs the type to the automatic driving control unit 250 together with information on a position and a speed thereof.

The communication device 220 is, for example, a wireless communication module for connecting to a network NW or directly communicating with another vehicle, a terminal device of a pedestrian, or the like. The communication device 220 is configured to perform wireless communication on the basis of Wi-Fi, dedicated short range communications (DSRC), Bluetooth (registered trademark), or another communication standard. As the communication device 220, a plurality of communication devices 220 may be prepared according to purposes.

The navigation device 230 includes, for example, a human machine interface (HMI) 232, a global navigation satellite system (GNSS) receiver 234, and a navigation control device 236. The HMI 232 includes, for example, a touch panel type display device, a speaker, or a microphone. The GNSS receiver 234 measures its own position (a position of the vehicle 200) on the basis of radio waves coming from a GNSS satellite (for example, a GPS satellite). The navigation control device 236 includes, for example, a central processing unit (CPU) or various storage devices, and controls the entire navigation device 230. Map information (navigation map) is stored in the storage device. The navigation map is a map representing roads with nodes and links. The navigation control device 236 determines a route from the position of the vehicle 200 measured by the GNSS receiver 234 to a destination designated using the HMI 232 by referring to the navigation map. The navigation control device 236 may transmit the position and the destination of the vehicle 200 to a navigation server (not shown) using the communication device 220 and acquire the route received in response from the navigation server. In the case of this embodiment, the route to the destination may be designated by the service assistance device 300. The route may include information on a point at which the vehicle stops to allow the user to ride or exit the vehicle and a target arrival time. The navigation control device 236 outputs the information on the route determined by any one of the above methods to the recommended lane determination device 240.

The recommended lane determination device 240 includes, for example, a map positioning unit (MPU) and various storage devices. In the storage devices, detailed map information with higher precision than the navigation map is stored. The high-precision map information includes, for example, information such as a road width, a gradient, a curvature, and a position of a signal for each lane. The recommended lane determination device 240 determines a recommended lane that is preferable for the vehicle to travel along the route input from the navigation device 230, and outputs the recommended lane to the automatic driving control unit 250.

The automatic driving control unit 250 includes one or more processors such as a CPU and a micro processing unit (MPU), and various storage devices. The automatic driving control unit 250 causes the vehicle 200 to travel automatically so that contact with an object of which the position and the speed are input from the outside-world monitoring unit 210 is avoided, with a rule that the vehicle travels on the recommended lane determined by the recommended lane determination device 240. The automatic driving control unit 250 sequentially executes various events, for example. The events include, for example, a constant-speed traveling event in which a vehicle travels on the same travel lane at a constant speed, a following traveling event in which a vehicle travels following a preceding vehicle (an event in which the subject vehicle travels while keeping a set distance between the subject vehicle and the preceding vehicle), a lane changing event, a merging event, a branching event, an emergency stopping event, a toll booth event for passing through a toll gate, and a handover event for ending automatic driving and performing switching to manual driving. An action for avoidance may be planned on the basis of a situation occurring near the vehicle 200 (presence of nearby vehicles or pedestrians, lane narrowing due to road construction, or the like) during execution of these events.

The automatic driving control unit 250 generates a target trajectory in which the vehicle 200 will travel in the future. The target trajectory includes, for example, a speed element. For example, the target trajectory is represented as a sequential arrangement of points (trajectory points) to be reached by the vehicle 200. The trajectory point is a point to be reached by the vehicle 200 for each predetermined traveling distance. A target speed and a target acceleration for each predetermined sampling time (for example, several tenths of a [sec]) are separately generated as a part of the target trajectory. The trajectory point may be a position to be reached by the vehicle 200 at the sampling time at every predetermined sampling time. In this case, information on the target speed or the target acceleration is represented by an interval between the trajectory points.

Figure 3:
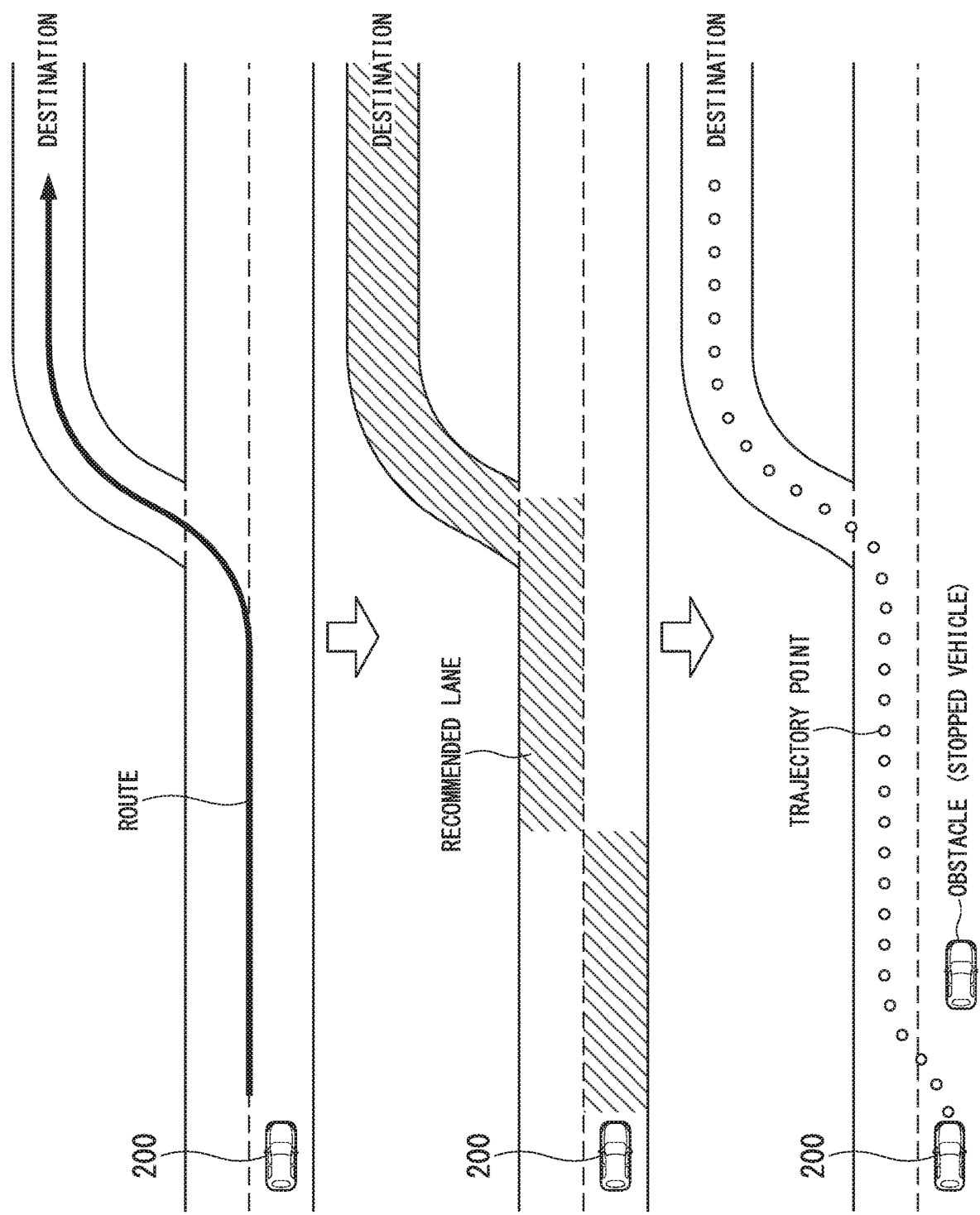
FIG. 3 is a diagram showing a process of automatic driving.

FIG. 3 is a diagram showing an automatic driving process. First, as shown in the upper figure, the route is determined by the navigation device 230. This route is, for example, a rough route in which there is no distinction between lanes. Then, as shown in the middle figure, the recommended lane determination device 240 determines recommended lanes that are easy to travel in along the route. Then, as shown in the lower figure, the automatic driving control unit 250 generates trajectory points for traveling along the recommended lane as much as possible while avoiding obstacles, and controls some or all of the driving force output device 260, the brake device 262, and the steering device 264 so that the vehicle travels according to the trajectory points (and an associated speed profile). Such role sharing is merely an example, and for example, the automatic driving control unit 250 may perform the process in a centralized manner.

The driving force output device 260 outputs a travel driving force (torque) for travel of the vehicle to driving wheels. The driving force output device 260 includes, for example, a combination of an internal combustion engine, an electric motor, a transmission, and the like, and a power ECU that controls these. The power ECU controls the above configuration according to information input from the automatic driving control unit 250 or information input from a driving operator (not shown).

The brake device 262 includes, for example, a brake caliper, a cylinder that transfers hydraulic pressure to the brake caliper, an electric motor that generates the hydraulic pressure in the cylinder, and a brake ECU. The brake ECU controls the electric motor according to information input from the automatic driving control unit 250 or information input from the driving operator so that a brake torque according to a braking operation is output to each wheel. The brake device 262 may include a mechanism that transfers the hydraulic pressure generated by an operation of a brake pedal included in the driving operator to the cylinder via a master cylinder as a backup. The brake device 262 is not limited to the configuration described above but may be an electronically controlled hydraulic brake device that controls an actuator according to information input from the automatic driving control unit 250 and transfers the hydraulic pressure of the master cylinder to the cylinder.

The steering device 264 includes, for example, a steering ECU and an electric motor. The electric motor, for example, applies a force to a rack and pinion mechanism to change directions of steerable wheels. The steering ECU drives the electric motor according to the information input from the automatic driving control unit 250 or the information input from the driving operator to change the directions of the steerable wheels.

[Service Assistance Device]

Referring back to FIG. 1, the service assistance device 300 includes, for example, a communication unit (communicator) 310, an acquisition unit (acquirer) 320, a group formation unit (group former) 330, a service processing unit (service specifier) 340, a guide unit (guide controller) 350, and a storage unit 380.

The communication unit 310 is, for example, a network card for connection to the network NW. The storage unit 380 is realized by a hard disk drive (HDD) or a flash memory, a random access memory (RAM), a read only memory (ROM), and the like. The communication unit 310 communicates with the terminal device 100 or the vehicle 200 over the network NW.

The acquisition unit 320, the group formation unit 330, the service processing unit 340, and the guide unit 350 are realized, for example, by a processor such as a CPU executing a program (software) stored in the storage unit 380. Some or all of these functional units may be realized by hardware such as a large scale integration (LSI), an application specific integrated circuit (ASIC), or a field-programmable gate array (FPGA), or may be realized by software and hardware in cooperation. The program may be stored in a storage device such as a hard disk drive (HDD) or a flash memory in advance. The program may be stored in a detachable storage medium such as a DVD or a CD-ROM, the storage medium may be mounted on the drive device, and the program may be installed in the storage device.

The acquisition unit 320 acquires position information associated with each of a plurality of users, and movement direction information associated with each of the plurality of users. For example, the movement direction information includes information indicating movement direction or a plurality of position coordinates associated with time. A movement direction (a direction of a destination) can be recognized from the movement direction information. For example, the acquisition unit 320 derives movement direction based on the plurality of position coordinates. The "associated with position information" may be position information of the user (the terminal device 100 carried by the user) or may be position information of the vehicle 200 that the user is riding. When the position information of the vehicle is used, a user ID is transmitted together with the position information of the vehicle 200 to the service assistance device 300 by the vehicle 200 or the terminal device 100. The acquisition unit 320 stores the acquired information as user information 382.

FIG. 4 is a diagram showing an example of content of the user information 382. As shown in FIG. 4, the user information 382 is information in which position information, a destination, a movement direction, attributes (sex, age, or the like) of a user, an ID of a vehicle that the user rides, and the like are associated with a user ID that is identification information of a user which has been registered in advance. The vehicle ID is acquired by, for example, the vehicle 200 communicating with the terminal device 100 of the user in advance. The attributes of the user may include some or all of a sex, a physique, a body temperature, a subscription and application situation of an option service, a hometown, a transit point, and the like of the user.

The map information 384 includes a group service providing point indicating an overview of various group service providing points in addition to information on nodes and links (such information may be included in a navigation map or a high accuracy map of the vehicle 200). FIG. 5 is a diagram showing an example of content (details) of the group service providing point information included in the map information 384. The group service providing point information is, for example, information in which a position, content of the group service providing point, content of the group service at the group service providing point, and the like are associated with a group service providing point ID which is identification information of the group service providing point. The content of the group service providing point is information indicating a location of the group service providing point. The content of the group service is, for example, a privilege that can be received when grouped users visit the group service providing point. This group service providing point may be, for example, a group service providing point affiliated with an operator of the service assistance system 1 or may be a group service providing point performing a discount service for a group.

The group formation unit 330 groups some or all of the plurality of users on the basis of the information acquired by the acquisition unit 320. Grouping includes, for example, assigning a group ID to a group of a plurality of vehicle IDs or a plurality of user IDs.

The service processing unit 340 specifies a group service that can be provided to the users on the basis of the attributes of the users included in the group grouped by the group formation unit 330. The service processing unit 340 performs a process of providing the applied group service to the users on the basis of information of an application request for the group service transmitted by the vehicle 200 or the terminal device 100 and received by the communication unit 310. Performing the process of providing the group service to the users includes, for example, transmitting a group service reservation request to the group service providing point terminal 400 to perform reservation of the group service so that the users can receive the group service at the group service providing point, or providing information indicating that the group service has been reserved for the users.

The guide unit 350 causes the users or the vehicles 200 that the users ride to approach one another on the basis of the position information associated with the respective users belonging to the formed group. Causing the users to approach one another includes instructing the vehicle 200 that the user rides to travel toward another vehicle 200 or providing position information of another user included in the group and the route to approach the other user to the terminal device 100 of the user to request the user to approach the other user. The guide unit 350 may generate a target trajectory on which the vehicle 200 will travel in the future and transmit information on the generated target trajectory to the vehicle 200. The guide unit 350 may instruct the vehicle 200 to travel to a group service providing point at which the group service is received.

The group service providing point terminal 400 is, for example, a terminal device provided at the group service providing point of the user. The group service providing point terminal 400 is configured to perform, for example, reservation of the group service on the basis of a group service reservation request transmitted from the service assistance device 300. The group service providing point terminal 400 transmits information indicating that the reservation has been completed, map information on the group service providing point or the surroundings of the group service providing point, and the like to the service assistance device 300.

[Process Flow and Scene Example]

Figure 6:
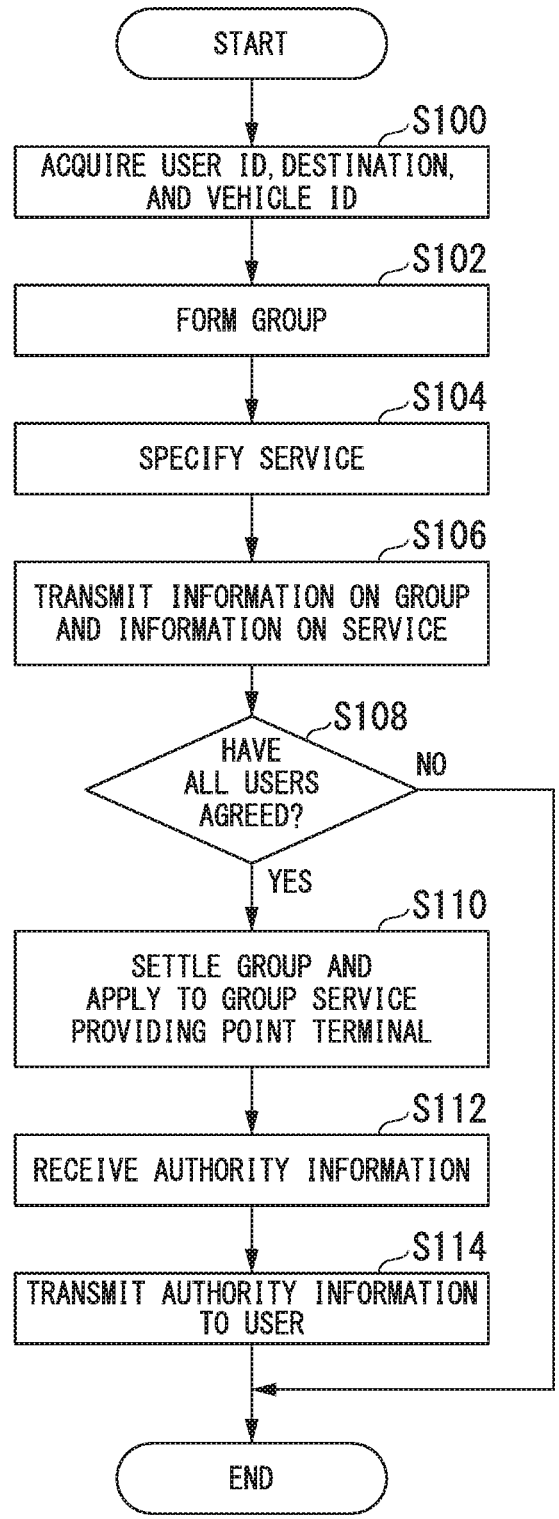
FIG. 6 is a flowchart (part 1) showing an example of a flow of a process executed by a service assistance device.

FIG. 6 is a flowchart (part 1) showing an example of a flow of a process that is executed by the service assistance device 300. Description will be given on the assumption that, in this process, travel directions (destinations) of the users riding the vehicles 200-1 to 200-3 are the same, and a destination thereof is the group service providing point. Description will be given on the assumption that, in this process, the service assistance device 300 acquires the user ID, the destination of the user, and the vehicle ID registered in advance from the vehicle 200, but the user ID, the destination, and the vehicle ID of the vehicle that the user rides may be acquired from the terminal device 100.

First, the acquisition unit 320 acquires information on the user ID, the destination, and the vehicle ID (step S100). Then, the group formation unit 330 forms a group of users present in a predetermined range and having the same destination (step S102). The users may be users gathered at a predetermined position within a predetermined time, rather than the users within the predetermined range. For example, the group is formed so that a plurality of users riding the same vehicle 200 are included in the same group.

Next, the service processing unit 340 specifies the group service on the basis of the number of users included in the formed group (step S104). For example, the service processing unit 340 specifies the content of the group service associated with the group service providing point of the formed group by referring to the group service providing point information included in the map information 384. When there are a plurality of group services associated with the group service providing point, the service processing unit 340 may specify a plurality of group services. In step S104, the service processing unit 340 may specify the group service on the basis of an attribute of the user or on the basis of the number and attributes of the users. For example, when an age of each user is high, the group service estimated to be preferred by the users is specified.

Figures 7, 8:
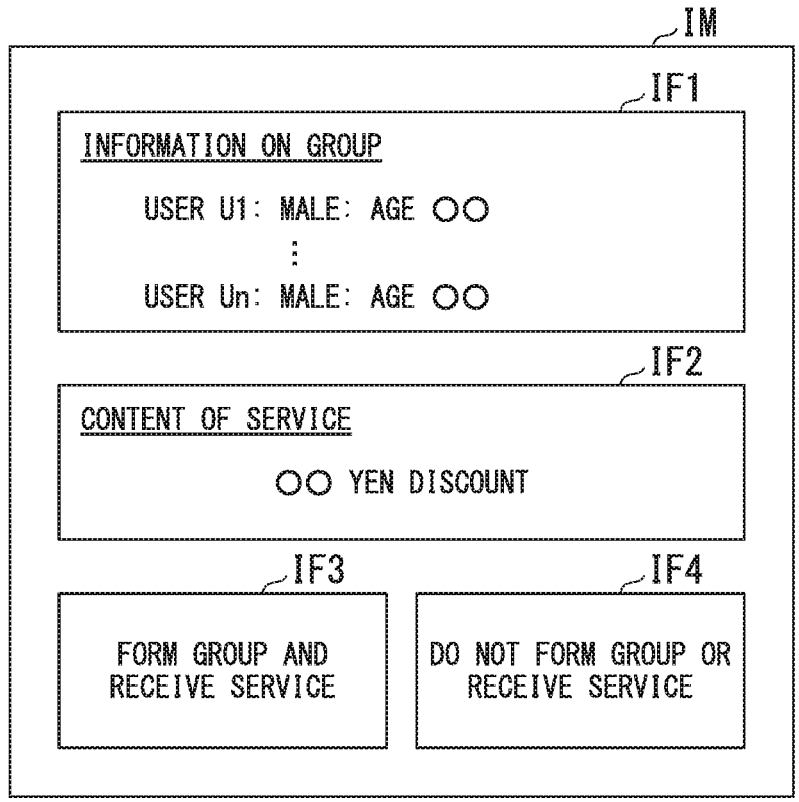
FIG. 7 is a diagram showing an example of an image.
FIG. 8 is a diagram showing an example of content of group information.

The service processing unit 340 transmits information on the group formed in step S102 and information on the specified group service to the vehicles 200 included in the group (step S106). The information on the group is, for example, information indicating that the vehicles are grouped, or attributes of the grouped users. The information on the group service is, for example, details of the group service which is received when the group visits the group service providing point. Accordingly, the vehicle 200 receives the information on the group and the information on the group service. In the touch panel type display device of the vehicle 200, the image IM is displayed, as shown in FIG. 7. The image IM includes group information IF1, group service information IF2, and information IF3 and IF4 with content of inquiring of the users about whether to form a group and receive the group service. For example, the user riding the vehicle 200 is configured to perform an operation on the touch panel type display device to indicate whether to form a group and receive the group service or not receive the group service by referring to the information on the group and the information on the group service. The vehicle 200 transmits information indicating the operation result of the user to the service assistance device 300.

Next, the service processing unit 340 acquires information indicating the response of the user to the inquiry from the vehicle 200, and determines whether all of the users have agreed to form a group and receive the group service (step S108). The service processing unit 340 determines that the users agree to receive the group service when an operation is performed to indicate that the group is formed and the group service is received, from all the vehicles 200 included in the group.

The service processing unit 340 may transmit the group information and the group service information to the terminal devices 100 of the users in the formed group. In this case, the service processing unit 340 acquires information indicating a response of the user to the inquiry from the terminal device 100.

When the service processing unit 340 determines that all of the users agree to form a group and receive the group service, the service processing unit 340 causes the formed group to be settled as a group and is configured to perform an application for the group service to the group service providing point terminal 400 (step S110). For example, when the group service providing point terminal 400 receives the application for the group service from the service processing unit 340, the group service providing point terminal 400 receives, for example, the application for a group service and transmits a reception result (authority information for receiving the privilege) to the service processing unit 340. That is, the service processing unit 340 is configured to perform a process of providing the applied service to the users on the basis of the information on application of use for the service transmitted by the vehicle or the terminal device 100 and received by the communication unit 310. The authority information is, for example, identification information or text information, a predetermined image, or the like to be presented to a clerk at the group service providing point when the privilege is received.

When the application for the group service to the group service providing point terminal 400 is performed, the service processing unit 340 may reserve the group service with content according to the attributes of the users included in the group. For example, the service processing unit 340 identifies the age or sex of the user and makes a reservation so that the user can receive the service on the basis of a result of the identification.

When it is determined that not all users agree to form the group and receive the group service, the process of this flowchart ends. In this case, the users who ride the vehicles 200 other than the vehicles 200 ridden by the users who do not agree may form a group.

Next, the service processing unit 340 receives the authority information from the group service providing point terminal 400 (step S112) and transmits the received authority information to the vehicle 200 (step S114). Accordingly, the process of this flowchart ends. For example, the vehicle 200 displays an image including the authority information on the display unit of the vehicle 200. The user U can acquire the authority information by capturing the image displayed on the display unit with a camera of the terminal device 100, for example. The authority information may be transmitted to the terminal device 100 of the user U of the group.

Thus, the group formation unit 330 forms the group, and the service processing unit 340 specifies the group service to be provided, such that the group information 386 is generated. FIG. 8 is a diagram showing an example of content of the group information 386. The group information 386 is information in which the vehicle ID of the formed group, the user ID of the vehicle 200, the group service providing point (destination) of the vehicle 200, and the received group service are associated with the group ID. In the shown example, the users who ride the vehicles 200-1 to 200-3 are included in a group G1, and at a group service providing point D of the group G1, the users in the group G1 can receive a OO-yen discount service for usage.

When a plurality of group services are associated with the group service providing point, the service processing unit 340 may specify the plurality of group services, and transmit information on the specified group services to the vehicle 200 to cause the user to select a desired group service among the plurality of group services.

The service processing unit 340 may transmit a communication address of the vehicle 200 (or the terminal device 100) to each vehicle 200 (or terminal device 100) so that the users included in the group can communicate with one another. Accordingly, the users of the vehicle 200 and the other vehicles 200 can chat using the HMIs 232 (or the terminal devices 100). The service processing unit 340 may function as a server device that relays the communication among the vehicles 200. In this case, for example, the user of the vehicle 200 can chat with the user of the other vehicle 200 included in the group via the service processing unit 340, such that the user of the vehicle 200 can consult the user of the other vehicle 200 and determine the group service that the user desires to receive.

Through the above-described process, the service assistance device 300 can group the vehicle IDs on the basis of the group service provision point of the vehicle 200 and specify the group service that can be provided to the users on the basis of the group service provision point associated with the group. Thus, it is possible to improve convenience.

Figure 9:
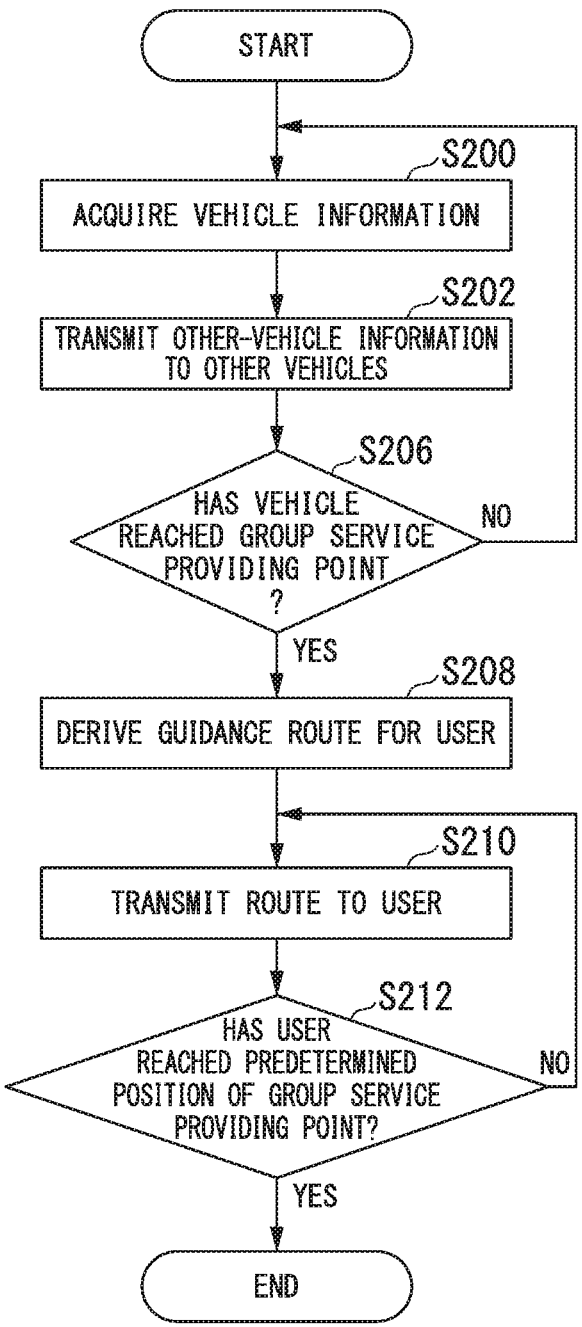
FIG. 9 is a flowchart (part 2) showing the example of the flow of the process executed by a service assistance device.

FIG. 9 is a flowchart (part 2) showing an example of a flow of a process that is executed by the service assistance device 300. First, the acquisition unit 320 acquires vehicle information (for example, the vehicle ID or the position information of the vehicle 200) (step S200). Then, the guide unit 350 transmits the acquired vehicle information to each of the vehicles 200 different from a transmission source of the vehicle information, and instructs the respective vehicles 200 to approach one another as described in FIG. 10, for example (Step S202). Accordingly, the user of the vehicle 200 can recognize the positions of the users in the group and they can approach one another.

Figure 10:
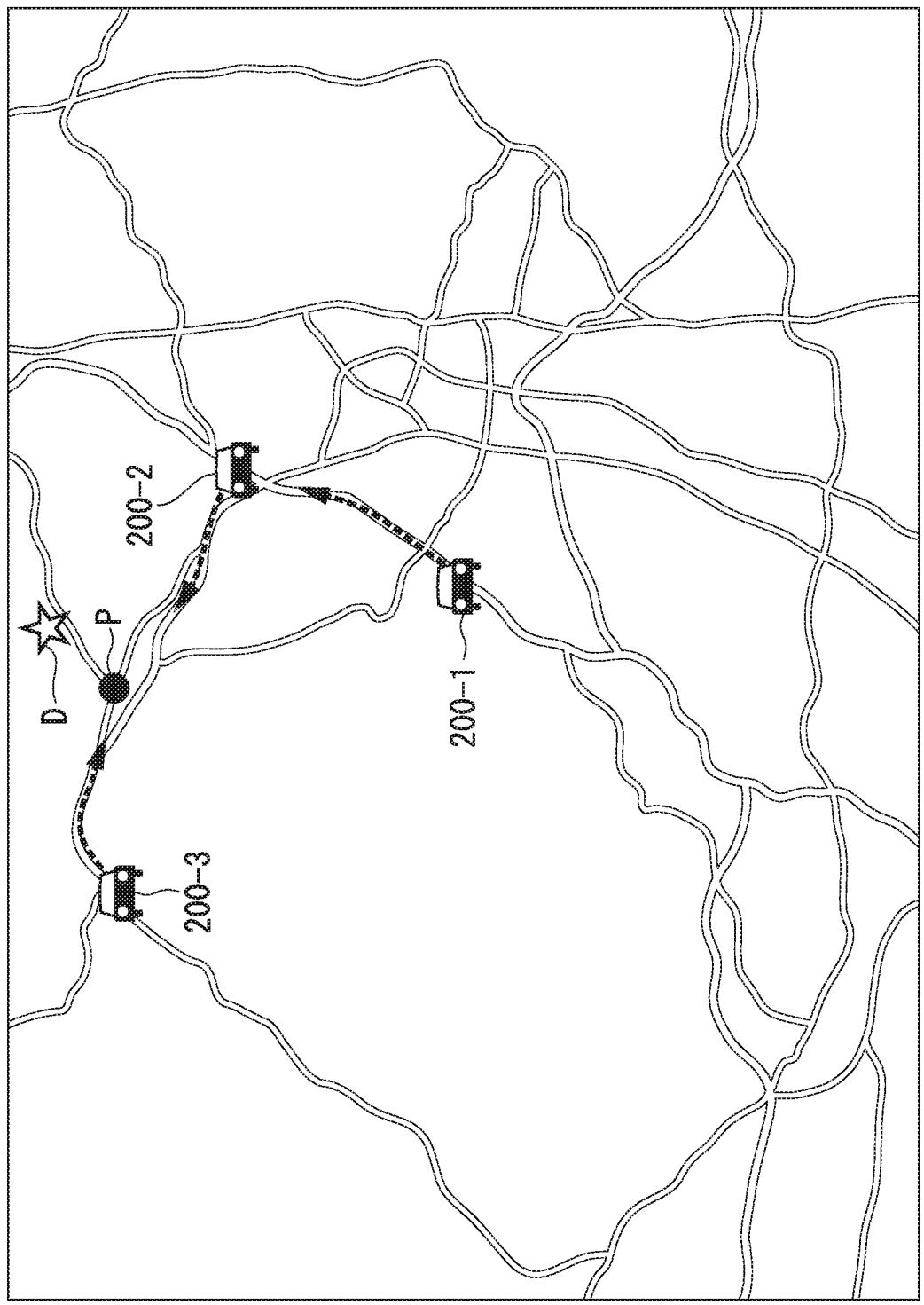
FIG. 10 is a diagram showing a state in which respective vehicles approach one another.
Figure 11:
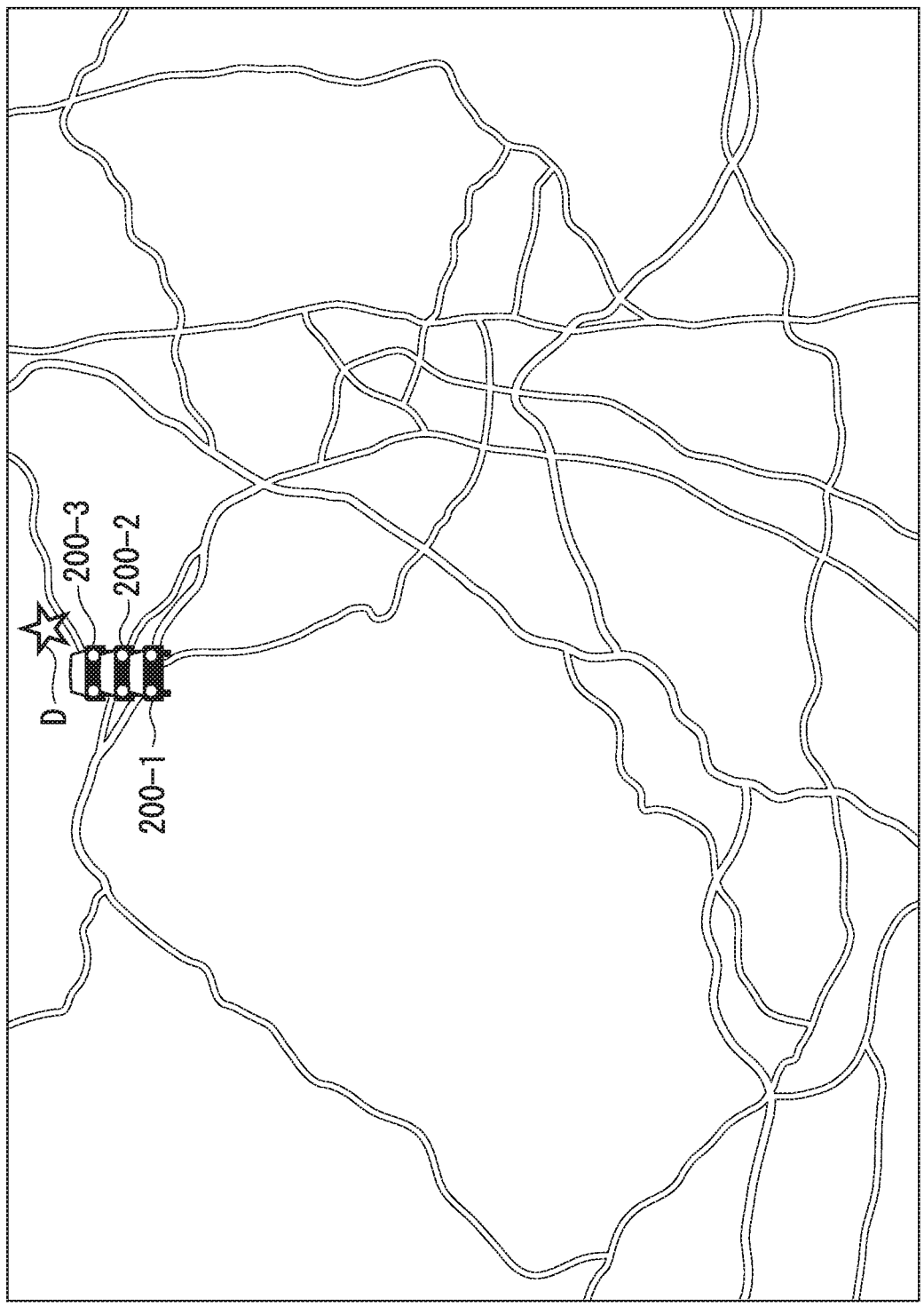
FIG. 11 is a diagram showing a state in which respective vehicles approach one another.

FIG. 10 is a diagram showing a state in which the respective vehicles 200 approach one another. As shown in FIG. 10, for example, when the grouped vehicles 200-1 to 200-3 are traveling toward the group service providing point D, the guide unit 350, for example, instructs the vehicles 200-1 to 200-3 to travel such that the vehicles merge at a predetermined meeting point P at a predetermined time T. Accordingly, the vehicles 200-1 to 200-3 recognize the positions of the vehicles 200 in the group and travel to reach the meeting point P at the predetermined time T while traveling to approach the vehicle 200 in the group. As shown in FIG. 11, the vehicles 200-1 to 200-3 can merge at the meeting point P at the predetermined time T and can be directed to the group service providing point, for example, in a row. For example, even when the vehicles 200-1 to 200-3 merge and then the users of the vehicles 200-1 to 200-3 chat and decide to take a detour on the route to the group service providing point or decide to change the group service providing point to another group service providing point, the vehicles 200-1 to 200-3 can move as a group.

Then, the guide unit 350 determines whether or not the vehicle 200 has reached the group service providing point (step S204). When the guide unit 350 determines that the vehicle 200 has not reached the group service providing point, the process returns to the process of step S200. When the guide unit 350 determines that the vehicle 200 has reached the group service providing point, the guide unit 350 derives a route to which the user is to be guided on the basis of map information of the group service providing point and the surroundings of the group service providing point acquired from the group service providing point terminal 400 in advance (step S208).

Then, the guide unit 350 transmits the derived route to the terminal device 100 of the user (step S210). Then, the guide unit 350 determines whether or not the user has reached a predetermined position of the group service providing point (step S212). The predetermined position is, for example, an entrance to a group service providing point, a sight within the group service providing point, and an attraction within the group service providing point. When the guide unit 350 determines that the user has not reached the predetermined position of the group service providing point, the process proceeds to step S210. When the guide unit 350 determines that the user has reached the predetermined position of the group service providing point, the process of this flowchart ends.

Figure 12A:
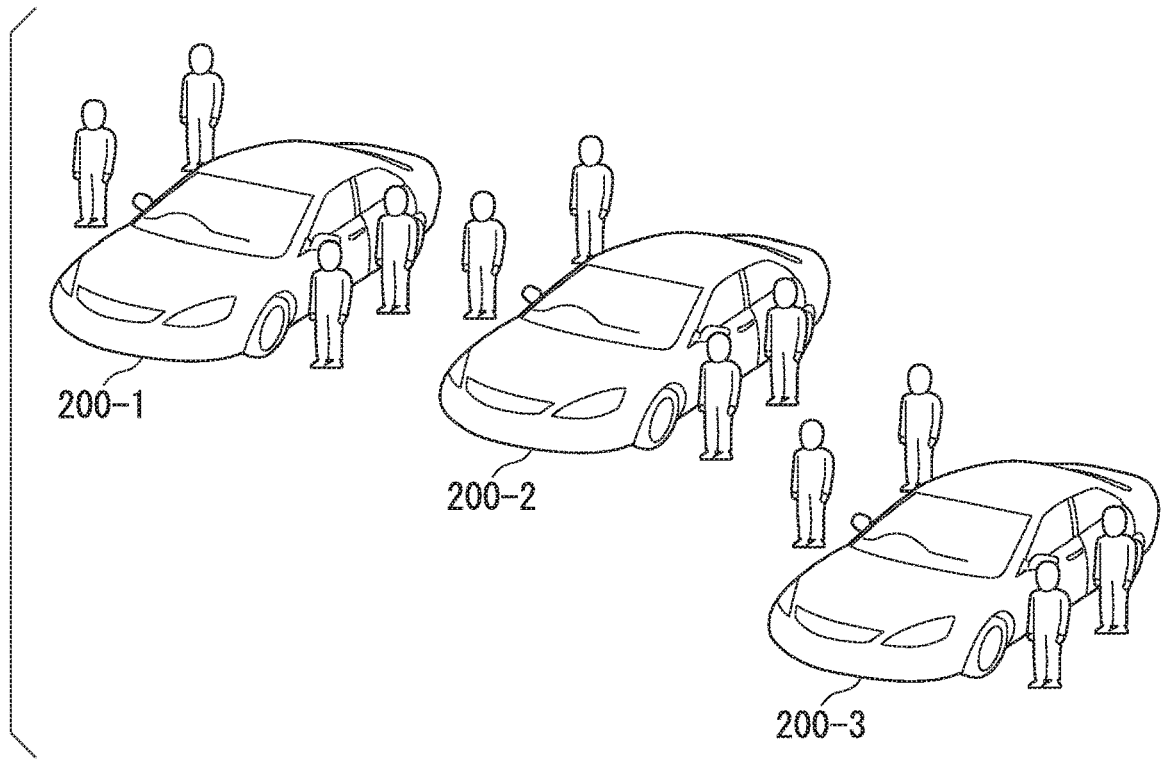
FIG. 12A is a diagram showing a state in which a vehicle has reached a destination.
Figure 12B:
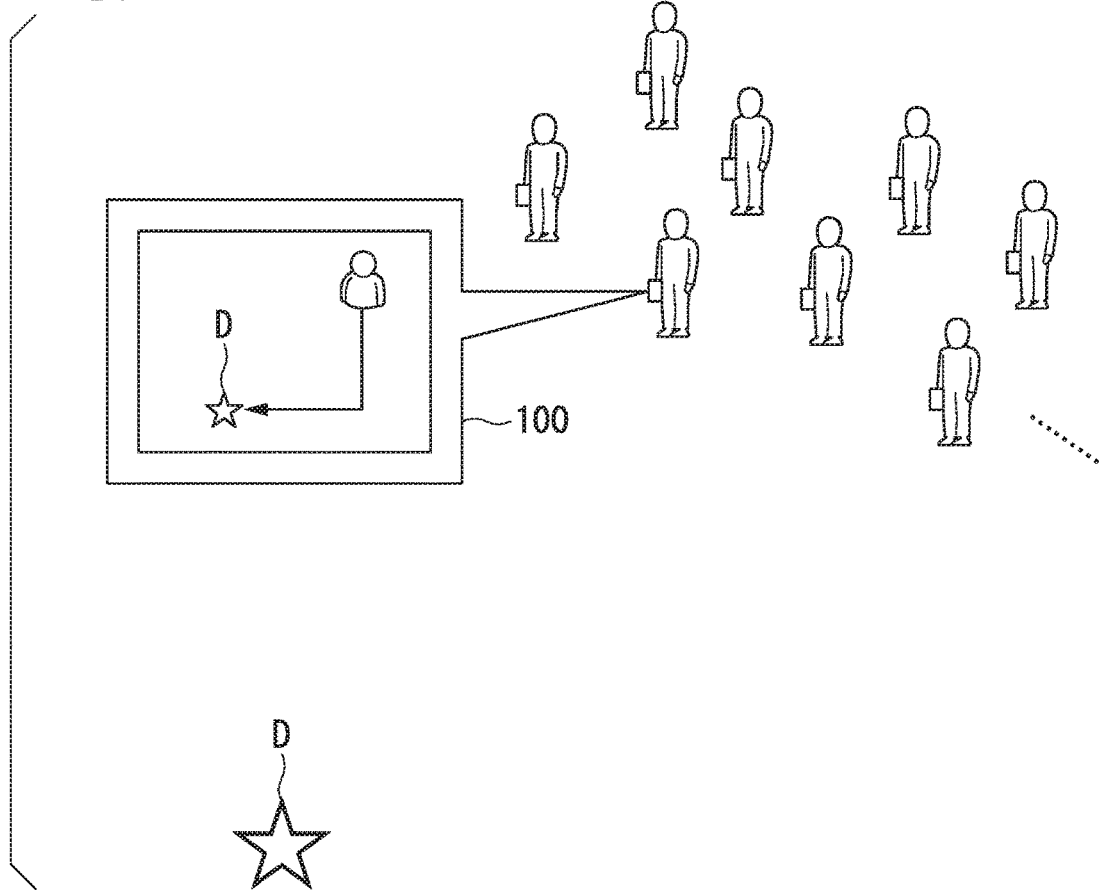
FIG. 12B is a diagram showing a state in which the vehicle has reached the destination.

FIG. 12 is a diagram showing a state in which the vehicle 200 has reached the group service providing point. When the vehicles 200-1 to 200-3 reach the group service providing point as a group as shown in FIG. 12A, for example, information for guiding the users to an entrance of the group service provision point is displayed on the display unit of the terminal device 100 of the user U in the group, as shown in FIG. 12B. For example, the guide unit 350 acquires the position information of the user, and transmits information for guiding the user to the entrance of the group service providing point to the terminal device 100 of the user on the basis of the acquired position information and the map information of the group service provision point. The information for guiding the user may be transmitted only to a preset representative user among the users included in the group or may be transmitted to any or all users.

For example, the guide unit 350 may provide the user with a route to which the user is directed after the user exits the vehicle 200 with guidance according to the attributes of the users included in the group. The provision to the user includes, for example, transmitting information to the terminal device 100 held by the user and displaying the information on the display unit of the terminal device 100. For example, the entrance of the group service providing point may be different according to a sex of the user or the like. Thus, when the user uses the group service providing point, the guide unit 350 transmits the information on the route associated with the sex of the user to the terminal device 100 of the user.

A function of deriving a route to which the user is guided and a function of causing the display unit of the terminal device 100 to display a route may be executed by the service assistance application of the terminal device 100 on the basis of the position information of the user and the map information of the group service providing point.

Through the process described above, the service assistance device 300 guides the user to a predetermined position after the vehicle 200 reaches the group service providing point. Thus, it is possible to further improve convenience for the user.

Although the vehicles 200 are controlled so that times at which the vehicles 200-1 to 200-3 reach the group service providing point match in the example described above, the vehicles 200-1 to 200-3 may be controlled so that the arrival times are different from one another. For example, the guide unit 350 may instruct the vehicles 200-1 to 200-3 to reach the group service providing point at predetermined intervals. For example, according to a situation of the group service providing point, it may be preferable for the vehicles 200 to reach the group service providing point at different times. In such a case, it is preferable for the vehicles 200-1 to 200-3 to reach the group service providing point at different times.

Although the description has been given on the assumption that the vehicles are grouped when the users are riding the vehicles 200 in the above example, the vehicles 200 or the users may be grouped before the users ride the vehicles 200.

Figure 13:
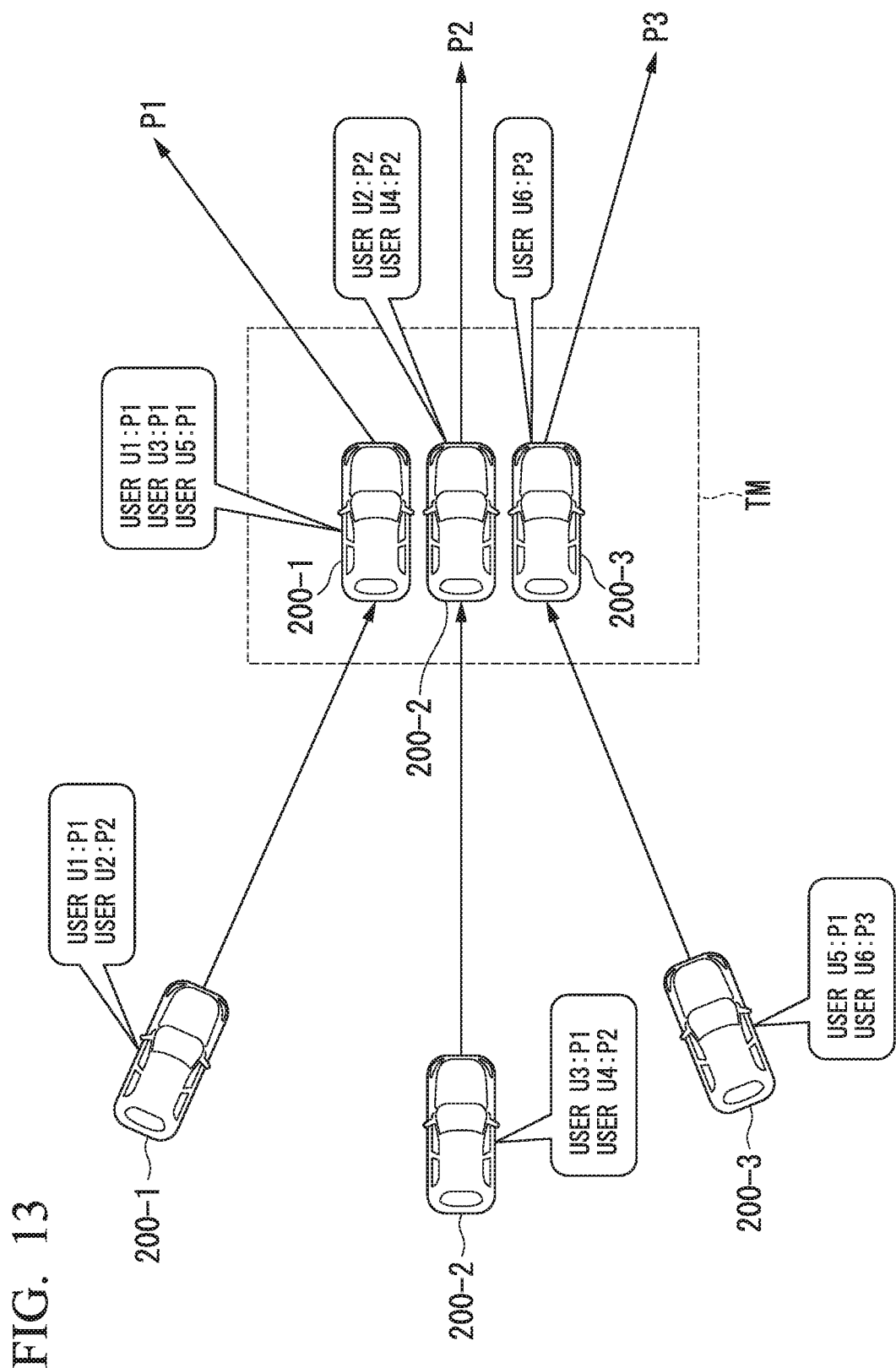
FIG. 13 is a diagram showing a state in which vehicles having different destinations but same transit points are grouped.

Although the vehicles 200 having the same movement direction are formed as a group in the above-described example, the users or the vehicles 200 having different movement directions may be grouped. In this case, the grouped users are vehicles 200 having different movement directions but the same transit points. FIG. 13 is a diagram showing a state in which vehicles 200 having different movement directions but the same transit points are grouped. The vehicles 200-1 to 200-3 are ride-sharing vehicles. For example, it is assumed that the users U1 and U2 ride the vehicle 200-1, users U3 and U4 ride the vehicle 200-2, and users U5 and U6 ride the vehicle 200-3. It is assumed that movement direction of the users U1, U3, U5 is P1, movement direction of the users U2 and U4 is P2, and the movement direction of the user U6 is P3.

In driving schedule information of each vehicle corresponding to the shown example, it is assumed that the vehicles 200-1 to 200-3 are scheduled to reach a terminal TM at the same time and the users are scheduled to transfer to the vehicle 200 directed in the traveling direction and be directed in the movement direction. For example, the user directed in a movement direction P1 transfers to the vehicle 200-1, the user directed in the movement direction P2 transfers to the vehicle 200-2, and the user directed in the movement direction P3 transfers to the vehicle 200-3. In such a case, the users directed in the same traveling direction before reaching the terminal TM (for example, the users U1, U3, and U5) may be grouped. Accordingly, users directed in the same traveling direction can exchange information in advance, or can apply for the group service in advance. For example, when there is no user U6 directed in the movement direction P3, the terminal TM becomes the movement direction instead of a transit point for the vehicle 200-3, but the user U5 may be grouped with the user directed in the movement direction P1 before reaching the terminal TM.

According to the first embodiment described above, the service assistance device 300 groups some or all of the users on the basis of the position information and the movement direction associated with each of the plurality of users acquired by the acquisition unit 320 and specifies the group service that can be provided to the users on the basis of the attributes of the users included in the group. Thus, it is possible to allow users that cannot normally receive the group service to receive the group service.

Second Embodiment

Hereinafter, a second embodiment will be described. In the first embodiment, it is assumed that the users are grouped and then the group service is specified. On the other hand, in the second embodiment, the group service is specified and then the users are grouped. Hereinafter, differences between the second embodiment and the first embodiment will be mainly described.

Figure 14:
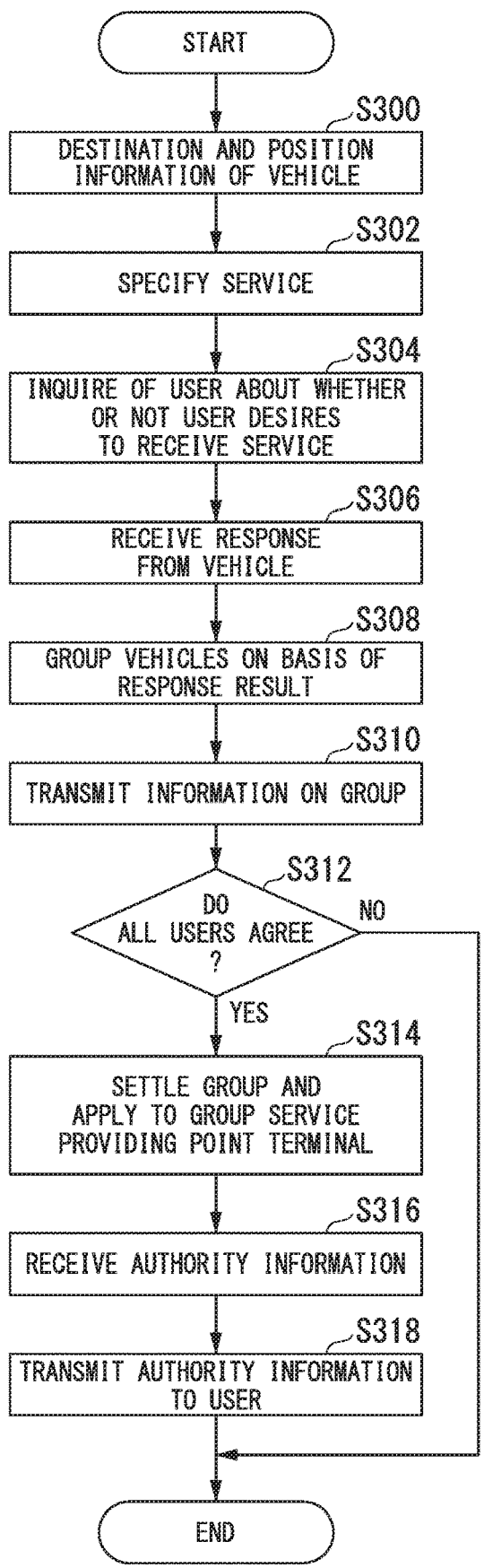
FIG. 14 is a flowchart showing an example of a flow of a process that is executed by a service assistance device of a second embodiment.

FIG. 14 is a flowchart showing an example of a flow of a process that is executed by the service assistance device 300 according to the second embodiment.

Figure 15:
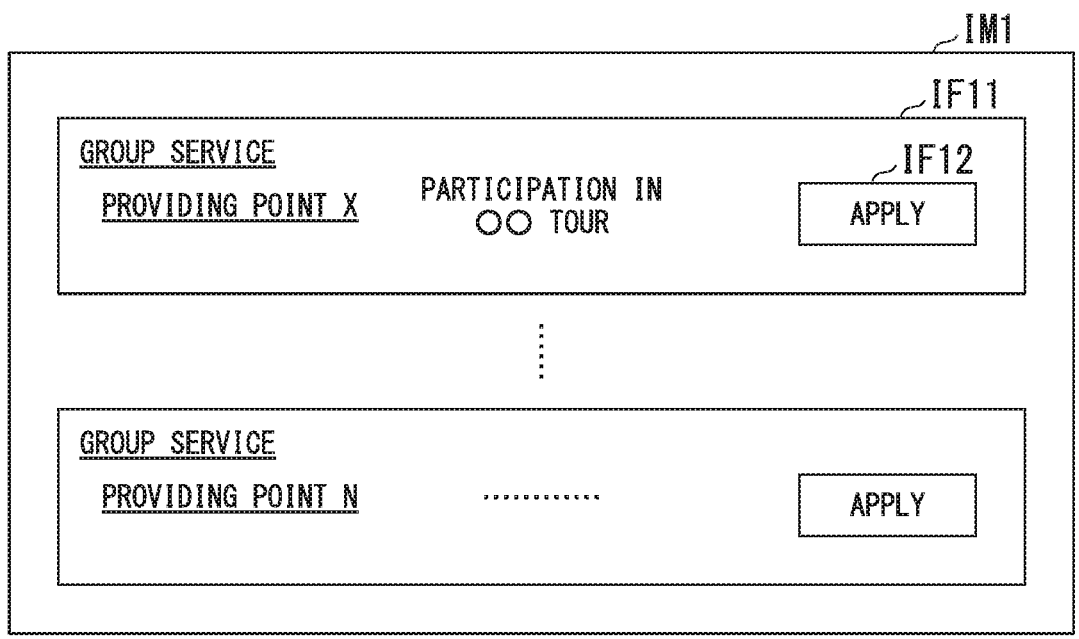
FIG. 15 is a diagram showing an example of an image.

First, the acquisition unit 320 acquires information on the user ID and the destination (step S300). Then, the service processing unit 340 specifies a group service providing point present in a predetermined direction and one or more group services to be provided at the group service providing point (step S302). Then, as shown in FIG. 15, the service processing unit 340 transmits information for causing the display unit to display information including the specified group service IF11 and inquiry information IF12 for inquiring of the user about the group service desired to be received, to the vehicle 200 that is moving in a predetermined direction within a predetermined range (step S304).

Next, the service processing unit 340 receives a response to the inquiry from the user of the vehicle 200 (step S306). Then, the group formation unit 330 groups the vehicles 200 on the basis of a response result (step S308). For example, the group formation unit 330 groups the vehicles 200 ridden by the users who desire to receive the same group service.

Next, the service processing unit 340 transmits information on the formed group, information on the specified group service, and inquiry information for inquiring of the users about whether or not the users agree to be grouped to the vehicles 200 included in the group (step S310). Then, the service processing unit 340 determines whether or not all of the users agree, on the basis of a result of the response to the inquiry information transmitted from the vehicle 200 (step S312).

When the service processing unit 340 determines that all of the users agree to form a group and receive the group service, the service processing unit 340 settles the group and applies for the group service to the group service providing point terminal 400 (step S314). When not all users agree to form a group and receive the group service, the process of this flowchart ends. In this case, the users of the vehicle 200 other than the user of the vehicle 200 who does not agree may be formed as a group.

Then, the service processing unit 340 receives the authority information from the group service providing point terminal 400 (step S316), and transmits the received authority information to the vehicle 200 (step S318). Accordingly, the process of this flowchart ends.

According to the second embodiment described above, the service assistance device 300 groups the users having the same group service to be provided at the group service providing point present in the movement direction of the vehicle 200, which is selected by the users. Thus, it is possible to provide the group services to the users.

According to the embodiment described above, the service assistance device 300 includes an acquisition unit 320 that is configured to acquire position information associated with each of a plurality of users and movement direction information associated with each of the plurality of users, a group formation unit 330 that is configured to group some or all of the plurality of users on the basis of the position information and the movement direction information, and a service processing unit 340 that is configured to specify a group service for the user on the basis of attributes of users included in the group grouped by the group formation unit 330. Thus, it is possible to allow users that cannot normally receive the group service to receive the group service.

Although modes for carrying out the present invention have been described above using embodiments, the present invention is not limited to these embodiments at all, and various modifications and substitutions may be made without departing from the spirit of the present invention.

For example, the service assistance device 300 may be mounted in the vehicle 200. When the vehicle 200 is a manually driven vehicle, the communication unit 310 may communicate with the terminal device of the driver of the vehicle 200 over the network NW.

What is claimed is:

1. A service assistance device, comprising:
an acquirer configured to acquire position information associated with each of a plurality of users and movement direction information associated with each of the plurality of users;
a group former configured to group some or all of the plurality of users on the basis of the position information and the movement direction information, the some or all of the plurality of users comprising a first user and a second user, destination of the first user being a first destination, destination of the second user being a second destination;
a service specifier configured to specify a service for the users on the basis of attributes and a number of the users included in the group, the service being usable by the users, the number being more than a predetermined number and to specify a service providing point that provides the service to the users; and
a guide controller configured to:
generate target trajectories for guiding the first user and the second user or a first vehicle that the first user rides and a second vehicle that the second user rides based on the position information associated with each of the first user and the second user, the target trajectories making the first user and the second user approach each other:
make a first arrival time and a second arrival time approach each other based on the target trajectories, the first arrival time being a first time when the first user arrives at the service providing point, the second arrival time being a second time when the second user arrives at the service providing point; and
update the target trajectories based on arrival situations of the first user and the second user or of the first vehicle and the second vehicle with respect to the service providing point.

2. The service assistance device according to claim 1, further comprising:
a communicator configured to communicate with terminal devices of the first user and the second user or the first vehicle and the second vehicle,
wherein the service specifier is configured to perform a process of providing an applied service to the first user or the second user on the basis of an application request for the service transmitted by the first vehicle or the second vehicle or the terminal devices and received by the communicator.

3. The service assistance device according to claim 1, wherein the service specifier is configured to provide information indicating that the users are grouped or information on the grouped users to the users in the group.

4. The service assistance device according to claim 1, wherein the service specifier is configured to provide the users with authority information that is used when the users receive service.

5. The service assistance device according to claim 1, wherein the service specifier is configured to reserve the service with content according to the attributes of the users included in the group.

6. The service assistance device according to claim 1, a wherein the guide controller is configured to guide the first user and the second user or the first vehicle and the second vehicle to approach one another on the basis of position information associated with the respective users belonging to the formed group.

7. The service assistance device according to claim 1, a wherein the guide controller is configured to provide the first user and the second user with a route to which the first user and the second user are directed after the first user and the second user exit the first vehicle and the second vehicle with guidance according to the attributes of the users included in the group.

8. The service assistance device according to claim 1, wherein the users ride automatically driven vehicles, and the service assistance device further comprises a guide controller configured to instruct the automatically driven vehicles to travel to a point at which the service is received.

9. A service assistance method using an in-vehicle computer, comprising:
acquiring position information associated with each of a plurality of users and movement direction information associated with each of the plurality of users;
grouping some or all of the plurality of users on the basis of the position information and the movement direction information, the some or all of the plurality of users comprises a first user and at least a second user, destination of the first user being a first destination, destination of the second user being a second destination; and
specifying a service for the users on the basis of attributes and a number of the users included in the grouped group, the service being usable by the users, the number being more than a predetermined number and to specify a service providing point that provides the service to the users;
generating target trajectories for guiding the first user and the second user or a first vehicle that the first user rides and a second vehicle that the second user rides based on the position information associated with each of the first user and the second user, the target trajectories making the first user and the second user approach each other:
making a first arrival time and a second arrival time approach one another based on the target trajectories, the first arrival time being a first time when the first user arrives at the service providing point, the second arrival time being a second time when the second user arrives at the service providing point; and
updating the target trajectories based on arrival situations of the first user and the second user or of the first vehicle and the second vehicle with respect to the service providing point.

10. A non-transitory computer-readable storage medium that stores a computer program to be executed by a computer to perform at least:
acquire position information associated with each of a plurality of users and movement direction information associated with each of the plurality of users;
group some or all of the plurality of users on the basis of the position information and the movement direction information, the some or all of the plurality of users comprising a first user and a second user, destination of the first user being a first destination, destination of the second user being a second destination; and
specify a service for the users on the basis of attributes and a number of the users included in the grouped group, the service being usable by users, the number being more than a predetermined number and to specify a service providing point that provides the service to the users;

generate target trajectories for guiding the first user and the second user or a first vehicle that the first user rides and a second vehicle that the second user rides based on the position information associated with each of the first user and the second user, the target trajectories making the first user and the second user approach one other;

make a first arrival time and a second arrival time approach each other based on the target trajectories, the first arrival time being a time when the first user arrives at the service providing point, the second arrival time is a time when the second user arrives at the service providing point; and update the target trajectories based on arrival situations of the first user and the second user or of the first vehicle and the second vehicle with respect to the service providing point.

* * * * *